United States Patent
Hussain (10) Patent No.: US 7,912,883 B2
(45) Date of Patent: Mar. 22, 2011

(54) EXPONENT PROCESSING SYSTEMS AND METHODS

(75) Inventor: Zahid Hussain, Ascot (GB)

(73) Assignee: Via Technologies, Inc., Hsin-Tien, Taipei (TW)

( * ) Notice: Subject to any disclaimer, the term of this patent is extended or adjusted under 35 U.S.C. 154(b) by 901 days.

(21) Appl. No.: 11/832,689

(22) Filed: Aug. 2, 2007

(65) Prior Publication Data
US 2009/0037504 A1 Feb. 5, 2009

(51) Int. Cl.
G06F 1/02 (2006.01)
(52) U.S. Cl. ....................................................... 708/277
(58) Field of Classification Search ................... 708/277
See application file for complete search history.

(56) References Cited

U.S. PATENT DOCUMENTS

| 5,604,691 A * | 2/1997 | Dworkin et al. | 708/277 |
| 6,178,435 B1 * | 1/2001 | Schmookler | 708/277 |
| 6,910,059 B2 * | 6/2005 | Lu et al. | 708/606 |

* cited by examiner

Primary Examiner — Tan V Mai
(74) Attorney, Agent, or Firm — Thomas, Kayden, Horstemeyer & Risley, LLP (57) ABSTRACT

Embodiments of exponent processing systems and methods are disclosed. One method embodiment, among others, comprises performing a first table lookup using a first address to provide a first value corresponding to the first component part, setting an integer exponent to provide an integer-based value corresponding to the integer component, performing a second table lookup using a second and third address to provide a second value and a third value corresponding to the second component part and the third component part, respectively, expanding and normalizing the second and third values to provide expanded and normalized second and third values, combining the expanded and normalized second and third values to produce a first product, and computing the exponential function by combining the first value, the integer-based value, and the first product.

61 Claims, 9 Drawing Sheets

EXPONENT PROCESSING SYSTEMS AND METHODS

CROSS-REFERENCE TO RELATED APPLICATION

This application is related to copending, commonly assigned U.S. utility patent application entitled "LOGARITHM PROCESSING SYSTEMS AND METHODS," filed on Sep. 9, 2005, and accorded Ser. No. 11/223,289, which is entirely incorporated herein by reference.

TECHNICAL FIELD

The present disclosure is generally related to processing systems, and, more particularly, is related to exponent processing systems and methods.

BACKGROUND

In graphics and scientific applications, exponent computations occur frequently. An exponent of a function is defined as $a^x = a^I \times a^f$, where $x = I + f$, I is the integer part and f is the fraction part. Also, x is a normalized floating-point number such that $x = 1.x_0 x_1 x_3 \ldots x_n \times 2^E$. The base 2 exponent of $x = I + z$ (with z replacing f) can be described as $2^x = 2^I \times 2^z$. One mechanism for implementing an exponent computation in a processing system, such as a central processing unit (CPU) or digital signal processor (DSP), is through the evaluation of a polynomial. One method for polynomial evaluation is a minimax polynomial for a single floating-point implementation (e.g., 0.9999998927+(0.6931547484+(0.2401397582+ (0.5586608429e-1+(0.8943041620e-2+0.1896367540e- 2*x)*x)*x)*x)*x). This evaluation method has a maximum error of 1.073000000e-7. One advantage of this method is that hardware normally available in a floating-point unit is all that is generally needed to implement the method. However, disadvantages of this method may include the number of instructions required and the latency in implementation.

Another method for implementing an exponential function includes a Taylor series approximation, which is described by the following equation:

$$y = 2^z = f(z_o) + (z_1 \times f'(z_o)) + \left(\frac{z_1^2}{2} \times f''(z_0)\right) \quad \text{(Eq. 1)}$$

In other words, the above exponential function $2^z$ can be described using a base function $f(z_0)$ and first ($f'(z_0)$) and second ($f''(z_0)$) derivatives of the same, plus some error terms to get an approximation of $f(z_1)$ (e.g., a delta function ($z_1$), comprising the difference between known (computed) values at $z_0$). An advantage of this approach is that it may be pipelined to give a result per instruction. However, when compared to the polynomial approach, additional components may be needed.

Further, a Taylor series approximation is typically implemented using dedicated hardware, as opposed to simply using a CPU, since these operations are not common and multiple specialized tables are typically added to the processor. Using a dedicated processing unit may result in a low return on investment if the exponential function is implemented infrequently. It would be desirable to implement such operations in an architecture that provides for more utilization frequency than conventional systems while using an optimum number of instructions.

SUMMARY

Embodiments of exponent processing systems and methods are disclosed. One method embodiment, among others, comprises performing a first table lookup using a first address to provide a first value corresponding to the first component part, setting an integer exponent to provide an integer-based value corresponding to the integer component, performing a second table lookup using a second and third address to provide a second value and a third value corresponding to the second component part and the third component part, respectively, expanding and normalizing the second and third values to provide expanded and normalized second and third values, combining the expanded and normalized second and third values to produce a first product, and computing the exponential function by combining the first value, the integer-based value, and the first product.

Such an embodiment may be implemented using an optimal number of primitive instructions supported by standard hardware. Additional optimizing features include performing shift operations to extract integer and fractional portions from a mantissa stored in source register, using the extracted integer part for setting the exponent while performing the first table lookup, implementing 1s-complement computations to simplify computations of negative values, and/or sharing of tables through the reduction of the issue rate, such as with implementations involving large single-instruction, multiple data (SIMD) parallel machines. These and other embodiments may be implemented using standard programmable hardware, such as programmable shader processing units.

In some embodiments, a further reduction in exponential computations may be realized through the use of larger tables, and thus larger address space, enabling elimination of a combining operation. Such tables may be size-reduced through the use of well-known bipartite table methods (BPTM). For low precision implementations, a single table lookup may suffice, further reducing computations.

Other systems, methods, features, and advantages of the present disclosure will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of exponent processing systems and methods (herein, referred to as exponent processing systems or system). Such exponent processing systems are configured to reduce the amount of dedicated logic devoted to evaluating exponential functions (e.g., $2^x$) and are configured to utilize existing programmable processing units that have standard floating-point, fused multiply-add (FMAD) hardware. To achieve this end, one or more exponent instruction sets are implemented that include "primitive" operations, which may already be supported in standard FMAD hardware. Additionally, a minimum set of instructions are used such that timing goals of existing processing pipelines are still met. The FMAD hardware is exploited by normalizing the inputs and configuring the floating-point numbers in a standardized format, such as the IEEE-754 floating-point format. Although described in the context of normalized, single-precision, IEEE-754 format, one skilled in the art will understand that double or higher precision format can be included within the scope of the preferred embodiments, such as through the extensions of the size of tables and/or fields.

In the disclosure that follows, an exemplary processing environment is described in which one or more exponent processing systems can be implemented, followed by a discussion with illustrations of system and method embodiments for implementing an exponential function, as well as a breakdown of the various portions of such embodiments. Although the disclosure is provided in the context of a computational core for a graphics processing environment, the disclosed embodiments may be incorporated in essentially any processing environment that evaluates an exponential function or functions. For example, the embodiments described herein may be used in or in conjunction with a central processing unit (CPU), digital signal processor (DSP), among other computational units for a variety of applications.

Certain embodiments of exponent processing systems comprise tables used to store component parts of a fractional component of an exponent, or similarly exponential, function. For instance, assume an evaluation of the exponential function $2^x$, where $2^x = 2^I \times 2^y$, where $2^I$ corresponds to an integer component and $2^y$ corresponds to the fractional component. The fractional component can be broken down into component parts according to well-known behavior of exponential functions, such that $2^y = 2^{y0} \times 2^{y1} \times 2^{y2}$. By providing tables for each component part, and performing various combining (e.g., multiplication) operations, the fractional component can be combined with an integer component to evaluate the exponential function. By breaking the fractional component down into component parts, smaller tables can be used compared to conventional systems. The values corresponding to the second ($2^{y1}$) and third ($2^{y2}$) component parts are preferably stored in compressed format, and various logic (e.g., hardware, such as wire-OR circuitry) is also included to normalize and expand the compressed values and provide the processed outputs to standard FMAD hardware configured to evaluate the exponential function. Compared to conventional systems, such embodiments operate under a reduced instruction set and avoid or mitigate the use of specialized hardware.

For instance, in one embodiment, a mantissa stored in a source register is extracted and shift functionality is imposed on the extracted mantissa to provide an integer part and a fraction part. The fraction part is used to address lookup tables that store component part values. At least two values (e.g., second value and third value) corresponding to the component parts $2^{y1}$ and $2^{y2}$ are stored in compressed form, whereas the value (e.g., first value) corresponding to the other component part $2^{y0}$ is stored in normalized format. By storing the values in compressed form, the table lookup operation pertaining to these compressed values can be performed in parallel, thus reducing the number of operations (and instructions). Further, such compressed values enable the storage of the looked-up values in a single register. The compressed values are acted upon to place such values in a format suitable for use in standard FMAD units to perform a combining (e.g., multiplication) operation in evaluating an exponential function. Formatting these values to an expanded and normalized format, such as IEEE-754, avoids or at least mitigates the need for specialized hardware, the latter which is common in conventional systems and methods.

As will be described below, the product of one combining operation (e.g., $2^{y1} \times 2^{y2}$) is further combined with the product of another combining operation (e.g., $2^I \times 2^{y0}$) to evaluate an exponential function (e.g., $2^x$). As a result of the above-mentioned shift functionality on the extracted mantissa to provide integer and fraction parts, the integer part is used to set the integer exponent in conjunction with the table lookup corresponding to the first component part $2^{y0}$. In one embodiment, 1s-complement operations may be performed to accommodate negative values, versus using conventional mechanisms that compute the absolute value and take the reciprocal of the result. Further, overflow or underflow that occurs in values corresponding to the integer part are handled through an exception handler that chooses predefined values in such conditions, or decides between a computed value and the value corresponding to the table lookup depending on an algorithm provided below. Thus, the result of this operation is the extraction from a table of the $2^{y0}$ value for combination with an integer portion ($2^I$) of the exponential function. Ultimately, the product of $2^I \times 2^{y0}$ is combined with the product $2^{y1} \times 2^{y2}$ to evaluate the exponential function. A standard FMAD unit may be used to implement the combining operations.

In another method embodiment, larger tables are used to enable the removal of one of the combining operations described above. The tables are optimized in size through the use of well-known bipartite table methods (BPTM). Although processing of the integer part is similar to that described in the previously described embodiment, the processing of the fraction part is different in that a single, BPTM table is used. Computation is directed to a single combining operation at a standard FMAD unit, utilizing the value from the first table lookup corresponding to $2^{k0}$ with a formatted value corresponding to $2^{k1}$ from the second BPTM table, as explained further below.

Additionally, a third method embodiment may comprise the integer part processing of this second method embodiment to provide a low precision (e.g., 12-bit accurate mantissa) value, such as for use in lighting computations.

In such embodiments described above, an optimal number of primitive instruction sets are implemented that maintain pipeline timing constraints while employing standard hardware. The compression of values in the fraction part of the above described processing enables an efficiency in table number or table lookup operations, and the formatting to normalized values allows standard hardware to be implemented.

Figure 1:
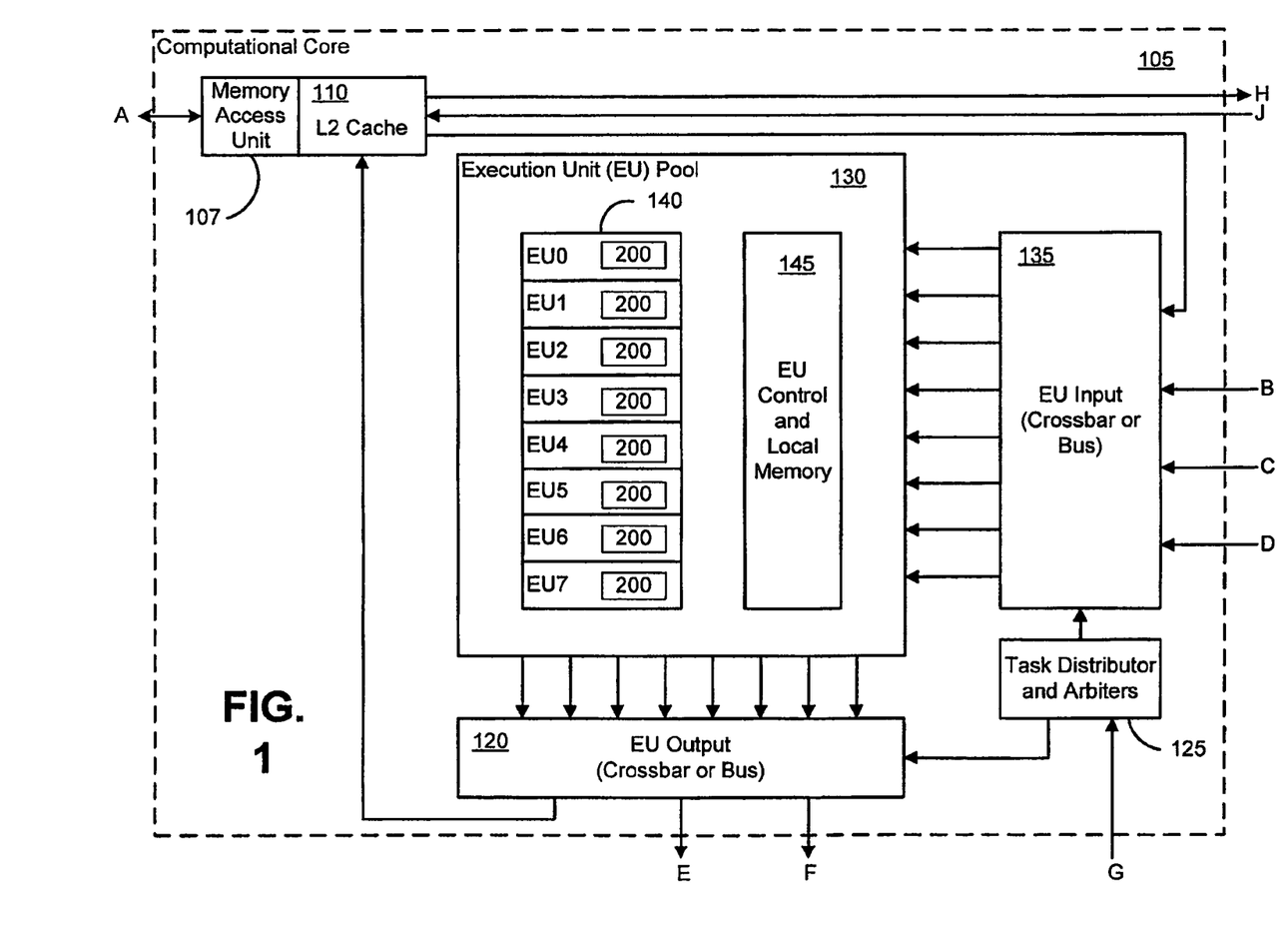
FIG. 1 is a block diagram that illustrates an example processing environment that includes exponent processing system embodiments described herein.

FIG. 1 is a block diagram showing a computational core 105 of a graphics processing unit (GPU). While not all components for graphics processing are shown, the components shown in FIG. 1 are sufficient for one having ordinary skill in the art to understand the general functions and architecture related to such graphics processors and exponent processing system embodiments. As shown in FIG. 1, the computational core 105 comprises a memory access unit 107 that is coupled to a level 2 (L2) cache 110. The memory access unit 107 receives the L2 prefetch and spill from, for instance, a memory interface unit (not shown). The L2 cache 110 receives pre-transform vertices (input J) from an input buffer (not shown) and provides post-transform vertices (output H) to triangle attribute units (not shown).

The computational core 105 also comprises an execution unit (EU) pool 130, which includes multiple execution units (EUs) 140 and an EU control and local memory 145. In one embodiment, each of the EUs 140 includes an exponent processing system 200 (as described further below), and each of the EUs 140 are capable of processing multiple instructions within a single clock cycle. In some embodiments, the exponent processing system 200 can include additional components shown (or not shown) in FIG. 1. Further, while eight (8) EUs are shown in FIG. 1 (labeled EU0 through EU7), it should be appreciated that the number of EUs need not be limited to eight, but may be greater or fewer in number for some embodiments.

The computational core 105 further comprises an EU input unit 135 and an EU output unit 120, which are respectively configured to provide the inputs to the EU pool 130 and receive the outputs from the EU pool 130. The EU input unit 135 and the EU output unit 120 may be a crossbar or a bus or other known input and output mechanisms.

The EU input unit 135 receives the pre-transform vertices (input B) from an input buffer, and provides such information to the EU pool 130 for processing by the various EUs 140. Additionally, the EU input unit 135 receives the pixel packet (input C) and the texel packet (input D) and conveys those packets to the EU pool 130 for processing by the various EUs 140. Also, the EU input unit 135 is configured to receive information from the L2 cache 110 and provide that information to the EU pool 130 as needed. Such information may be provided by the cache 110, crossbar 135, and/or generated locally from a prior operation. The value for which an exponent computation is performed is preferably located in a register local to the respective EU 140.

The EU output unit 120 receives the output of the EU pool 130, such as the UVRQ and the RGBA. Those outputs, among others, may be directed back to the L2 cache 110, or output (E) from the computational core 105 to a write-back unit (not shown), or output (F) to various texture units (not shown).

The computational core 105 also comprises task distributors and arbiters 125, which receive the tag/synchro from packet assembler (not shown). Using that input, the task distributors and arbiters 125 control the EU input unit 135 and the EU output unit 120. In other words, the task distributors and arbiters 125 control the respective inflow and outflow through the EU input unit 135 and the EU output unit 120. Instruction execution is implemented by hardware residing in each exponent processing system 200 (corresponding to each EU0-EU7).

Figure 2:
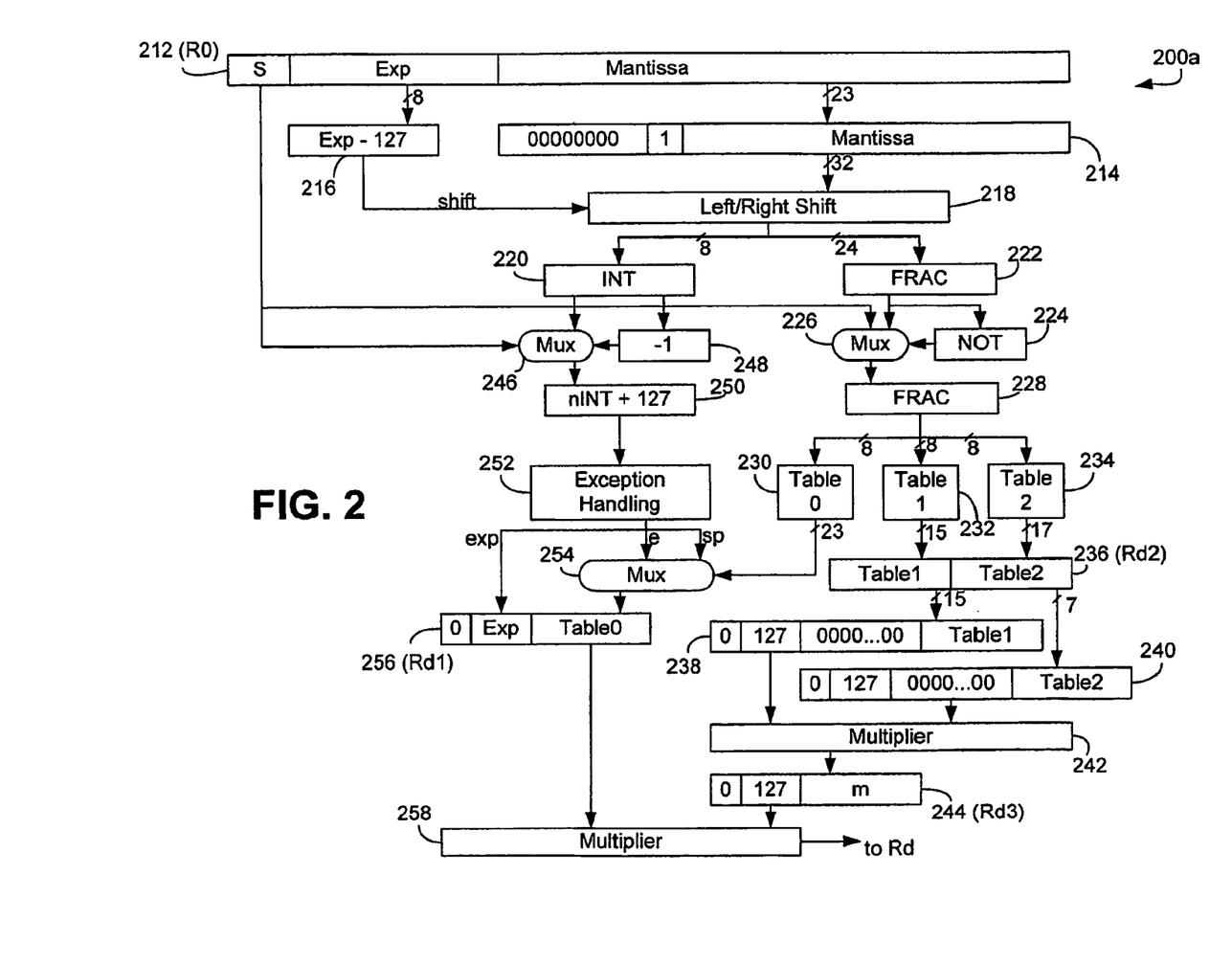
FIG. 2 is a block diagram that illustrates an embodiment of an exponent processing system.

FIGS. 2-6 are functional block diagrams that illustrate various embodiments of an exponent processing system 200 (e.g., 200a, 200b), which provide for improved processing in the evaluation of the exponent of a function f(x). Given an exponential function $2^x$, where $2^x = 2^I \times 2^y$, and where $2^y = 2^{y0} \times 2^{y1} \times 2^{y2}$ and, where $y = y0 + y1 + y2$, a computation (evaluation) of $2^x$ can be implemented using the exponent processing system 200. The blocks or components shown and described for FIGS. 2-6 represent functionality that may comprise one or more hardware devices, such as an arithmetic logic unit (ALU) or one or more components of the same, or other circuitry, registers, interconnect components (e.g., wiring, busses), etc. Referring to FIG. 2, the exponent processing system 200a includes registers 212 (R0, source register), 214 (temporary register), 218 (shift register), 220 (integer register), 222 (fractional register), 228 (fractional register), 236 (Rd2 or temporary register), 238 (first register), 240 (second register or simply, register), 244 (Rd3), 250 (integer register), and 256 (Rd1), subtractor block (subtractor logic) 216, inverter blocks 224 and 248, multiplexer (MUX) blocks 226, 246, and 254, lookup tables 230-234 (e.g., table0 230 or first table, table1 232 or second table, and table2 234 or third table) for storing $2^{y0}$, $2^{y1}$, and $2^{y2}$, respectively, multiplier blocks 242 and 258 (alone or when used with a temporary register(s) such as 244 and/or 256, also referred to herein as combining logic), and exception handling block (or exception handler) 252. Note that exception handling block 252 and multiplexer 254 are individually or collectively referred to also as exception handling logic. Note that registers 222 and 228, multiplexer block 226, and inverter block 224 are individually or collectively also referred to herein as register logic. Further, integer registers 220 and 250, multiplexer blocks 246 and 254, inverter block 248, and exception handling block 252 are individually or collectively also referred to herein as setting logic. Registers 238 and 240 are individually or collectively also referred to herein as formatting logic. In one embodiment, tables 230, 232, and 234 may be configured as read-only-memory (ROM).

The operation of exponent processing system 200a can be understood in the context of an exemplary instruction set, referred to herein as Algorithm 1.

| Algorithm 1: | | | |
|---|---|---|---|
| (1) | FRC | Rfrac := | R0 − floor (R0) |
| (2) | EXPTL1 | Rtb1 := | TableLookup1[Rfrac] |
| (3) | EXPTL2 | Rtb2 := | TableLookup2[Rfrac] |
| (4) | EXPTL3 | Rtb3 := | TableLookup3[Rfrac] |
| (5) | FMUL | Rtmp := | Rtb1 * Rtb2 |
| (6) | FMUL | Rtmp := | Rtb3 * Rtmp |
| (7) | EXPEXT | Rq := | floor(R0), Rr = 2^Rq |
| (8) | FMUL | Rdest := | Rr * Rtmp |

The source input value is stored in register 212 (data input or source register, R0). Register 212 may hold data corresponding to an exponential function in single precision (e.g., 32-bit) IEEE floating-point format, and may include a sign bit, exponent bits (e.g., 8 bits), and fractional or mantissa bits (e.g., 23 bits). Referring to instruction (1), the fraction part or source mantissa (or simply, mantissa) of the input value held in register 212 is extracted, and the mantissa, leading one, and eight zeroes are provided to register 214 (R:={00000000,1, R0[22,0]}, where "R" is a temporary register, such as register 214) in a denormalized format. The exponent portion in register 212 is applied to the subtractor block 216, which subtracts 127 from the exponent (i.e., N:=R0[30:23]−127) and provides the difference to register 218. The value (N) from register 214 is provided to register 218, where a left/right shift operation is performed. If N is negative, M: =R[31:0]>>N. If N is larger than 23, then all the bits are shifted out, and the input is 0, and the result would be 1.0. If N is positive M:=R[31.0]<<N.

The lower 24-bits of M (from register 218) are provided to register 222 (FRAC), which holds the fraction part. The upper 8 bits of M are provided to register 220 (INT), which holds the integer part. Right shifts larger than seven do not need to be performed, since these indicate that the input is either too large or too small. If the shift is larger than $2^{+127}$, then the result is +infinity, and if the shift is smaller than $2^{-127}$, then the result is 0. If (R0[31]==1) (i.e., the input was negative), then the contents of register 222 (FRAC) are negated via inverter block 224.

With regard to instructions (2)-(4), 8-bit segments from register 228 are applied as addresses to the lookup tables 230, 232, and 234, returning the results for $2^{y0}$, $2^{y1}$, and $2^{y2}$, respectively. Tables 232 and 234 provide their values to register 236 (Rd2). The respective table1 and table2 values are then provided to registers 238 and 240, respectively.

Regarding instruction (5), the values in registers 240 and 238 are multiplied at multiplier 242, with the product stored in register 244 (Rd3).

With regard to instruction (6), the value from register 256 (Rd1) is multiplied with the value from register 244 (Rd3) to compute $2^y$. In MUX block 246, the sign of R0 is used to select either the positive or negative (NOT—ones complement block 248) INT value. If the left shift performed in register 218 is saturating (i.e., if overflows), then a MAX value is set (e.g., 255). In register 250, an offset 127 is added since this value is used to set the exponent, and exponents are biased 127. Exception handling via blocks 252-256 is described below. Note that Exp=nINT+127 initially. The value e=1 sets the mantissa to a special value as computed in exception handling block 252, else it sets it to the Table0 value. Instructions (7) and (8) provide the integer component $2^I$ and the combining of the same with $2^y$, resulting in the evaluation of the exponent function $2^x$.

From the instruction set referred to above (Algorithm 1), several observations are made. With reference to Algorithm 1 and FIG. 2, processes for combining the fraction part can be combined and followed with the table lookups. The table lookups return normalized numbers in [1,2) (i.e., the number is greater than or equal to 1.0 and less than 2.0 (i.e., it is 1.xxxxxxxx . . . in binary fraction). Normal IEEE-754 numbers are in this range (i.e., 1.xxxx.*2^E)), so there is no need to perform the multiply in instruction (8). Thus, the integer part can be set as the exponent as part of the first table lookup operation (instruction (2) from Algorithm 1). These two optimizations remove the need for Algorithm 1 instructions (1), (7), and (8).

Additionally, since the TableLookup1 of instruction (2) returns a normalized 24-bit value in [1,2), there is no need to store the sign, exponent and the leading one. Consequently, only the 23-bit mantissa is stored in one embodiment. Similarly, for instructions (3) and (4) (TableLookup2 and TableLookup3), the returned values are normalized 24-bit values in [1,2). Hence, there is no need to store the sign, exponent and the leading one.

Furthermore, the TableLookup2 value is in the format 1.00000000$x_{14}x_{13}$ . . . $x_o$ and TableLookup3 value is in the format 1.0000000000000000$x_6x_5$ . . . $x_0$. Thus, the leading zeros need not be held in the tables. Since table1 232 and table2 234 are only 15 and 7 bits wide in one embodiment, respectively, the corresponding values can be looked up in parallel and the result stored in a single register.

Thus, based on these observations, the instructions corresponding to Algorithm 1 can be reduced, resulting in an embodiment of an instruction set (Algorithm 2) that can be described as follows:

Algorithm 2
(1) EXPTL1 Rd1, R0
(2) EXPTL2 Rd2, R0
(3) CFMUL Rd3, Rd2
(4) FMUL Rd, Rd3, Rd1

The exponent processing system 200a can implement an exponential function evaluation for $2^x = 2^I \times 2^y$ according to the four instructions provided above. Such an exponential function may be defined for both positive and negative numbers. Typically, the ability to address positive and negative numbers has been handled in the past by computing the exponent of an absolute input value, and if the value was negative, performing a reciprocal operation on the exponential function output. The exponent processing system 200a avoids such an operation for the following reason. Since $2^x = 2^I \times 2^y$ and x=I+y when x is negative, x can be expressed as x=(I−1)+(1−y) where the fraction part y is always positive [i.e., if x=−4.75 (or equivalently, 11000000100110000000000000000000), then x=−4.75=−5+0.25=−101.000+0.01]. Thus, the computation of (1−y) can be simplified by using a 1s-complement operation upon a check of whether x is negative. In other words, the computation of $2^y$ is accelerated, with the understanding that a complete solution requires the computation of $2^I$ and a final multiply to be performed.

For both EXPTL1 and EXPTL2 instructions (i.e., instructions (1) and (2), respectively), the fraction portion or mantissa in register 212 is extracted to address the tables 230, 232, and 234. Since, in one embodiment, EXPTL1 and EXPTL2 are executed sequentially, the same "FRAC" hardware 222 and 228 may be used for both operations.

Figure 3:
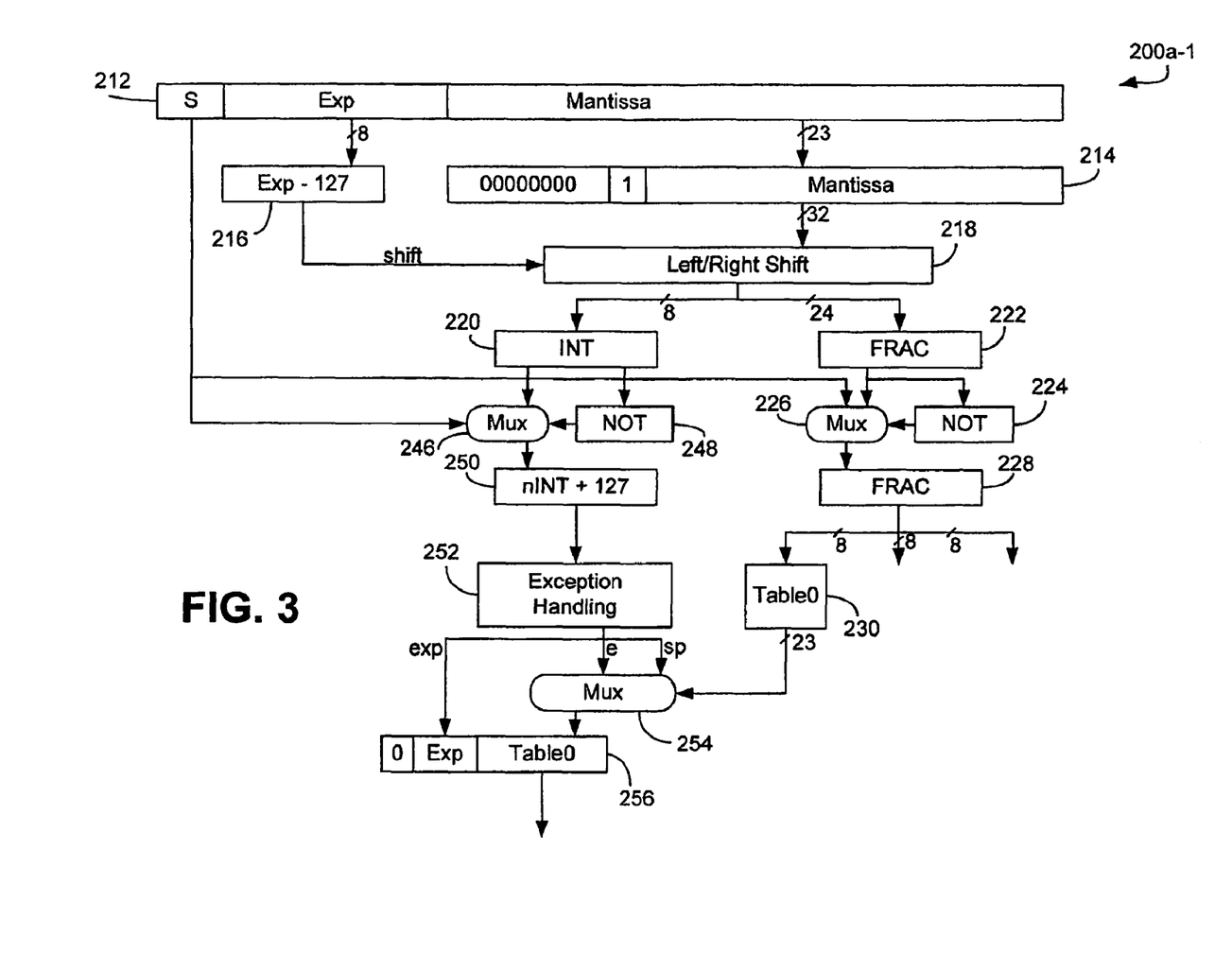
FIG. 3 is a block diagram that illustrates a portion of the embodiment shown in FIG. 2 for executing an EXPTL1 instruction.
Figure 4:
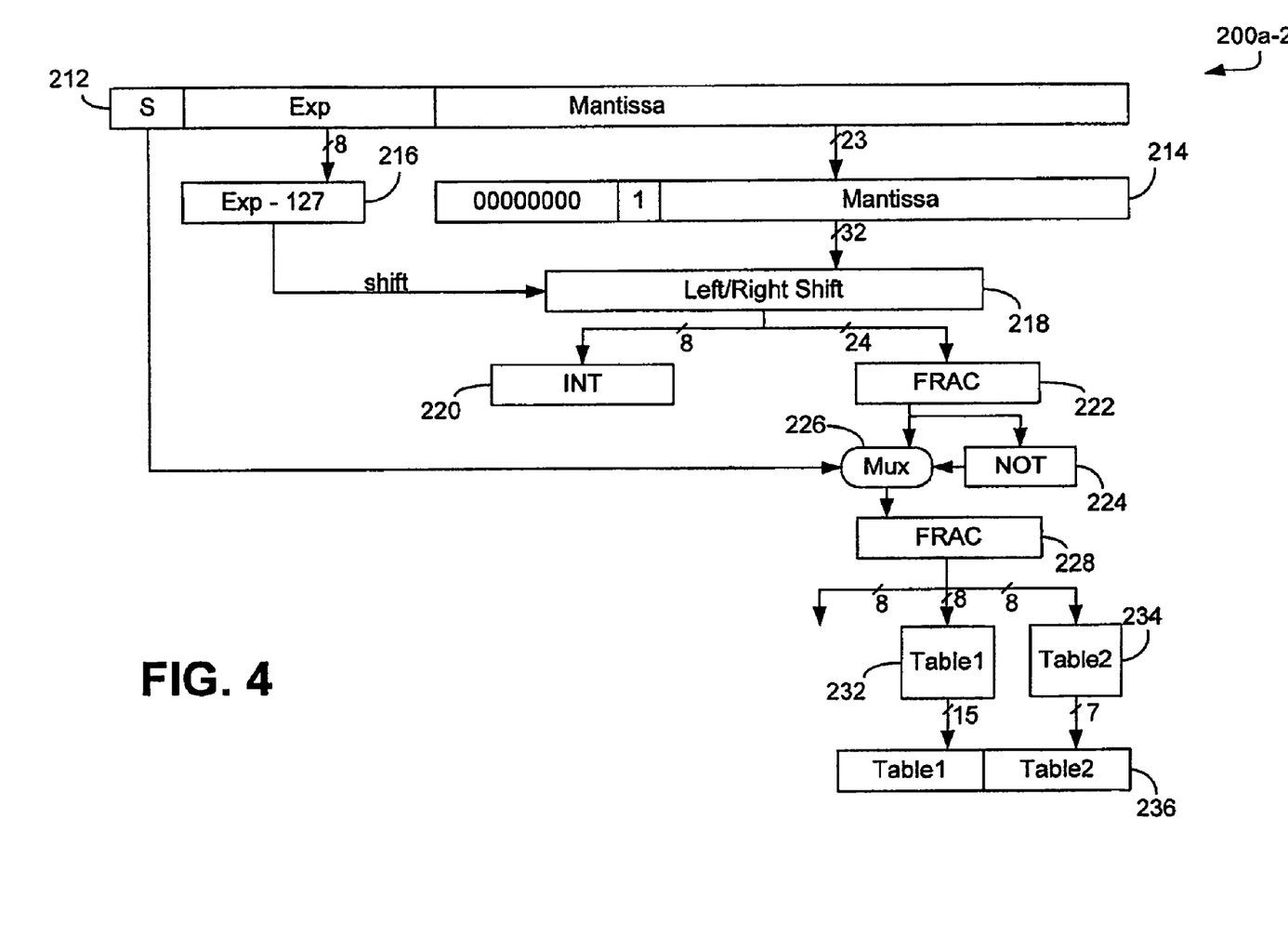
FIG. 4 is a block diagram that illustrates a portion of the embodiment shown in FIG. 2 for executing an EXPTL2 instruction.
Figure 5:
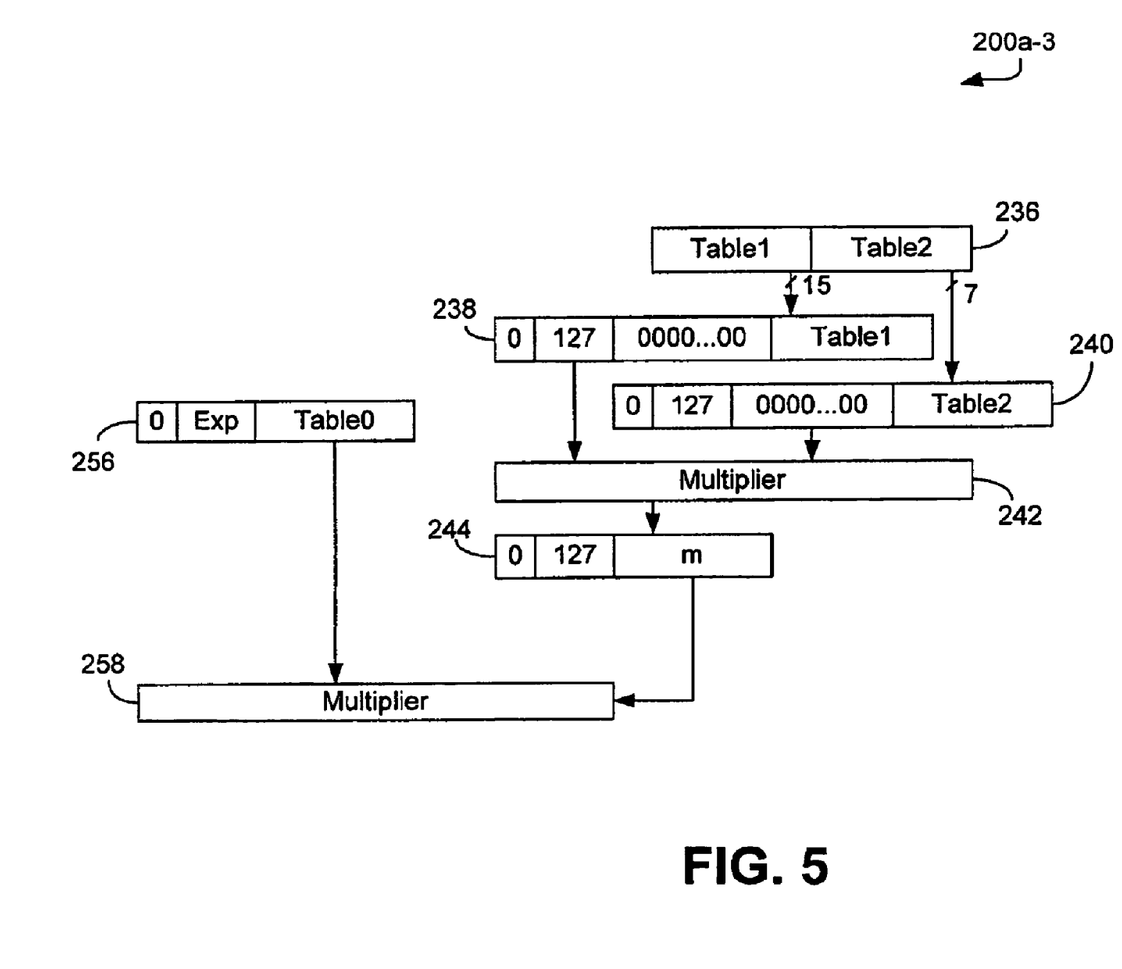
FIG. 5 is a block diagram that illustrates a portion of the embodiment shown in FIG. 2 for executing CFMUL and FMUL instructions.

FIGS. 3-5 comprise various portions of the exponent processing system 200a (e.g., 200a-1, 200a-2, and 200a-3) shown in FIG. 2, and are used to illustrate each of the four operations/instructions. Referring to FIG. 3, an exponent processing system 200a-1 is shown that illustrates the implementation of the EXPTL1 instruction (instruction (1)). The EXPTL1 instruction is used as part of the computation of $2^I \times 2^{y0}$. That is, using the fractional bits in register 218 (FRAC[23:16]), a table lookup is performed on Table0 230. In parallel to this operation, the integer exponent (I) and ultimately an integer-based value corresponding to the integer component ($2^I$) is computed. For example, the integer part is taken from register 218, and set as the exponent. The resulting value is now a signed (2s-complement), 8-bit value, to which 127 is added as a bias in register 250 resulting in an integer exponent value. The following exceptions are handled in the exception handling block 252. That is, the exception handling block 252 takes as input the re-biased integer exponent held in register 250, and implements the following method (described below in pseudo code):

(i) e=0;
(ii) if nINT+127 > 255, then e=1, exp=255, sp=0;
(iii) if nINT+127 < 0, then e=1, exp=0, sp =0;
(iv) if ((R0[30 . . . 23]= = 0xFF) && (R0[22:0] !=0)), then e=1, exp=255, sp=0x400000

Thus, depending on whether e is set, a value is selected ranging between a special value and the output of the Table lookup (Table0 230 value). In other words, the above pseudo code is for handling a special case. If INT>127, then the output table is set to the special value of Infinity (ii). If INT<−127, then the output is zero (iii). If input is NaN then output is NaN (iv). For each of these three cases the error e=1 is set. Otherwise e=0. The selection of the mantissa special case and "normal" table output ($2^{y0}$) is selected using e for the MUX 254. Exception handler 252 computes the correct integer exponent (e.g., performs the above algorithm).

The portions of exponent processing system 200a responsible for implementing the EXPTL2 instruction (instruction (2)) is illustrated in FIG. 4, and is referred to as exponent processing system 200a-2. The EXPTL2 instruction is used as part of the computation of $2^{y1} \times 2^{y2}$. Bits [15:8] and [7:0] from FRAC 228 are used to address lookups in Table1 232 and Table2 234, respectively. Bits [15:0] of FRAC 228 are effectively 0.00000000y1, so the value returned from Table1 232 is 1.00000000X1, and when the input is 0.0000000000000000y2 (i.e., bits [7:0] of FRAC 228), the output of Table2 234 is 1.0000000000000000×2. However, the leading $1.0^{*8}$ and $1.0^{*16}$ are not held in these tables. That is, the values stored in tables 232 and 234 are in compressed form. For example, tables 232 and 234 (e.g., ROM) each comprise 256 entries, each of which are 15-bits (table 232) and 7-bits (table 234) wide, respectively. The exponent and sign bit are not stored since the corresponding values are 127 and 0 (zero), respectively, and there are leading zeroes (e.g., 1.00000000xxxxxxxxxxxxxxx and 1.0000000000000000xxxxxxx). Thus the output of the EXPTL2 instruction, which in one embodiment is a 22-bit output of tables 232 and 234, is forwarded to a single output register 236 (e.g., a single 32-bit register, also referred to as register Rd2 or a temporary register), still in compressed format, where both table output values share unstored values corresponding to a common exponent (e.g., 127) and a common sign (e.g., 0).

FIG. 5 illustrates the CFMUL instruction (instruction (3)) and the FMUL instruction (instruction (4)). The CFMUL instruction (instruction (3)) multiplies the result of the lookups from Table1 232 and Table2 234 (EXPTL2 instruction result stored in register 236 to compute $2^{y1} \times 2^{y2}$). As described above, the values in source register 236 are in a compressed format. As shown in registers 238 and 240, the numbers are normalized and expanded (or decompressed). That is, the hardware or logic to perform expansion and normalization comprises a wire-OR operation to insert 127 (a bias value) and leading zeroes (i.e., leading zeros for the mantissa are added, and the exponent set to 127). The number of leading zeros added include eight (8) for register 238 and sixteen (16) for register 240. Since the values in registers 238 and 240 have been "expanded" to IEEE format, they can be fed to the FMUL unit 242, with a result provided to register 244. The FMUL operation (instruction (4)) corresponding to FMUL unit 258 comprises a normal multiply of two normalized floating-point numbers, one from register 244 (e.g., $2^{y1} \times 2^{y2}$) and the other from register 256 (e.g., $2^{I} \times 2^{y0}$). Note that the FMUL units 242 and 258 may comprise a single FMAD unit, although in some embodiments, separate FMAD units may be used.

Figure 6:
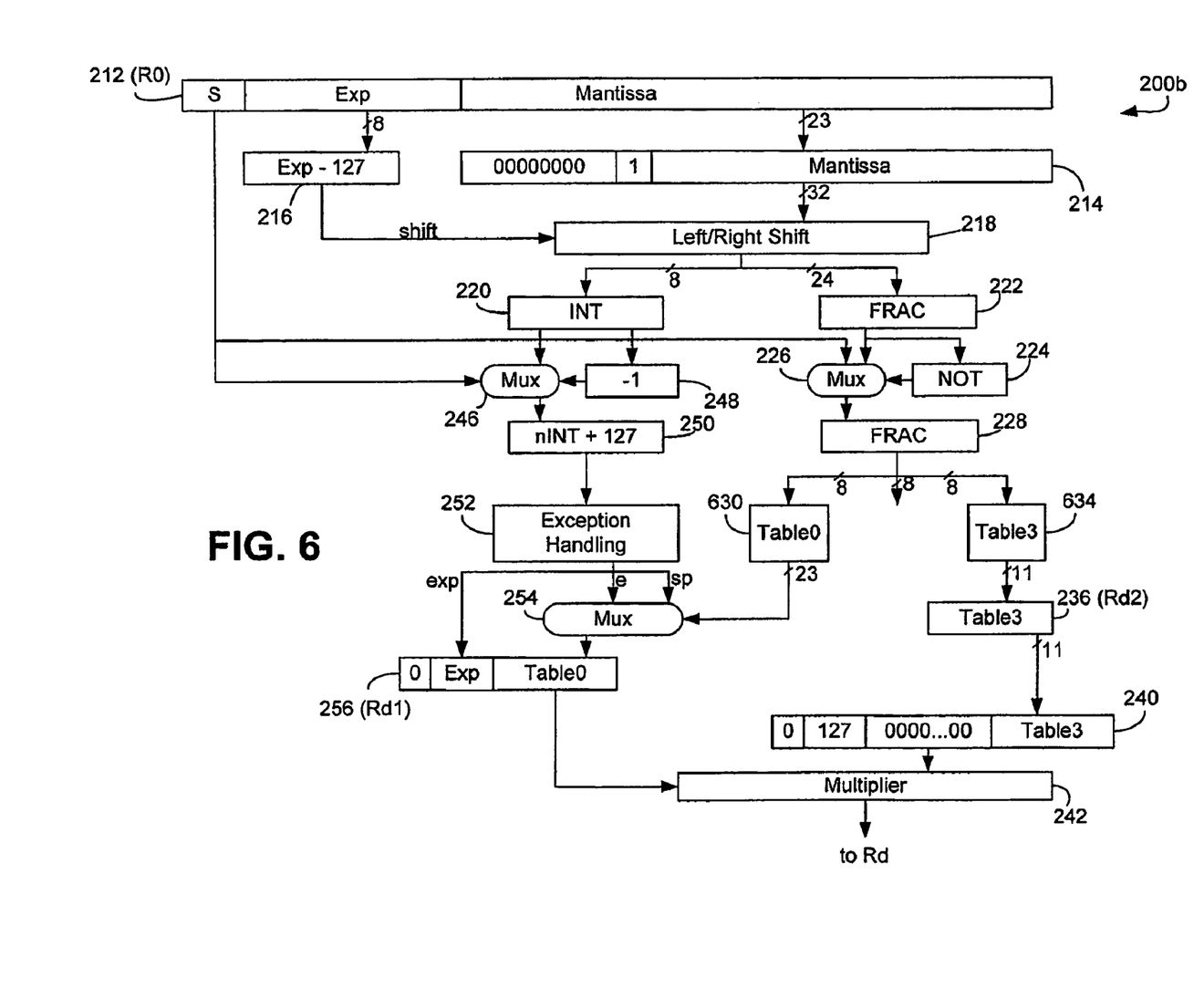
FIG. 6 is a block diagram that illustrates another embodiment of an exponent processing system.

From the above description, it is noted that one embodiment of an exponent processing method uses four operations: two table lookups (three tables, and one of the lookup operations occurs in parallel) and two multiplies. Additional optimization may be performed. For instance, the multiply (FMUL) in Algorithm 2 may be eliminated if larger tables are used (e.g., if $2^{y}=2^{y0} \times 2^{y1} \times 2^{y2}$ is replaced with $2^{y}=2^{k0} \times 2^{k1}$). Thus, $k_0$ and $k_1$ are larger addresses: 12 and 11 bits respectively. However, a known bipartite table method (BPTM) can be implemented to reduce the table sizes. Referring to FIG. 6, which provides another embodiment of an exponent processing system 200b (which incorporates much of the same components shown and described in FIG. 2, the discussion of which is omitted for brevity), the EXPTL1 instruction remains as before except that a Table0 630 (first BPTM table) is formed using a BPTM approach. The EXPTL2 instruction is implemented using a single table lookup on one Table3 634 (second BPTM table), the table3 634 configured using a BPTM approach. The leading one and leading twelve zeros in such an EXPTL2 table need not be stored in the table. One exemplary algorithm (Algorithm 3) may thus be defined below as follows:

Algorithm 3:
(1) EXPTL1 Rd1, R0
(2) EXPTL2 Rd2, R0
(3) CFMUL Rd, Rd2, Rd1

Using the smaller table approach of Algorithm 3, two table lookups are implemented and a CFMUL instruction. Thus, the main difference is that the CFMUL operation in Algorithm 3 is different than the CFMUL instruction of Algorithm 2. In the case of Algorithm 3, two source operands are used for the CFMUL operation. The first source operand, Rd1, is a fully normalized floating-point value from the first table lookup (corresponding to Table0 630). The Rd2 source operand value corresponding to table3 634 is in a compact (compressed) form, and is formatted as a floating-point value formed from the table by adding 12 leading zeroes to the mantissa and setting the biased exponent to 127 (register 240) using similar logic (e.g., wired-OR) to that described in the CFMUL operation. These two source operands can now be fed into a standard floating-point multiplier unit 242.

Note that the approach shown in FIG. 6 (a low precision, 12-bit accurate mantissa) can be obtained using the EXPTL1 instruction alone. For instance, if the 12-bit table is implemented for the EXPTL1 operation, then a low precision result does not necessitate steps (2) and (3) of Algorithm 3 (which is an advantage when calculating power functions in many graphics applications such as lighting computation, for instance). Thus, logic (comprising the setting logic referred to above and a single register, such as register 256) are used to provide a low precision value.

In some embodiments, since base-2 exponential utilization is relatively low compared to FMAD type of operations, the number of tables can be minimized by limiting the issue rate. For example, as shown in Algorithm 2, four instructions are required. If the issue rate of the EXPTL1/2 is limited to one every N cycles, then a single EXPTL1/2 unit can be shared over N single-instruction, multiple data (SIMD) units.

Figure 7:
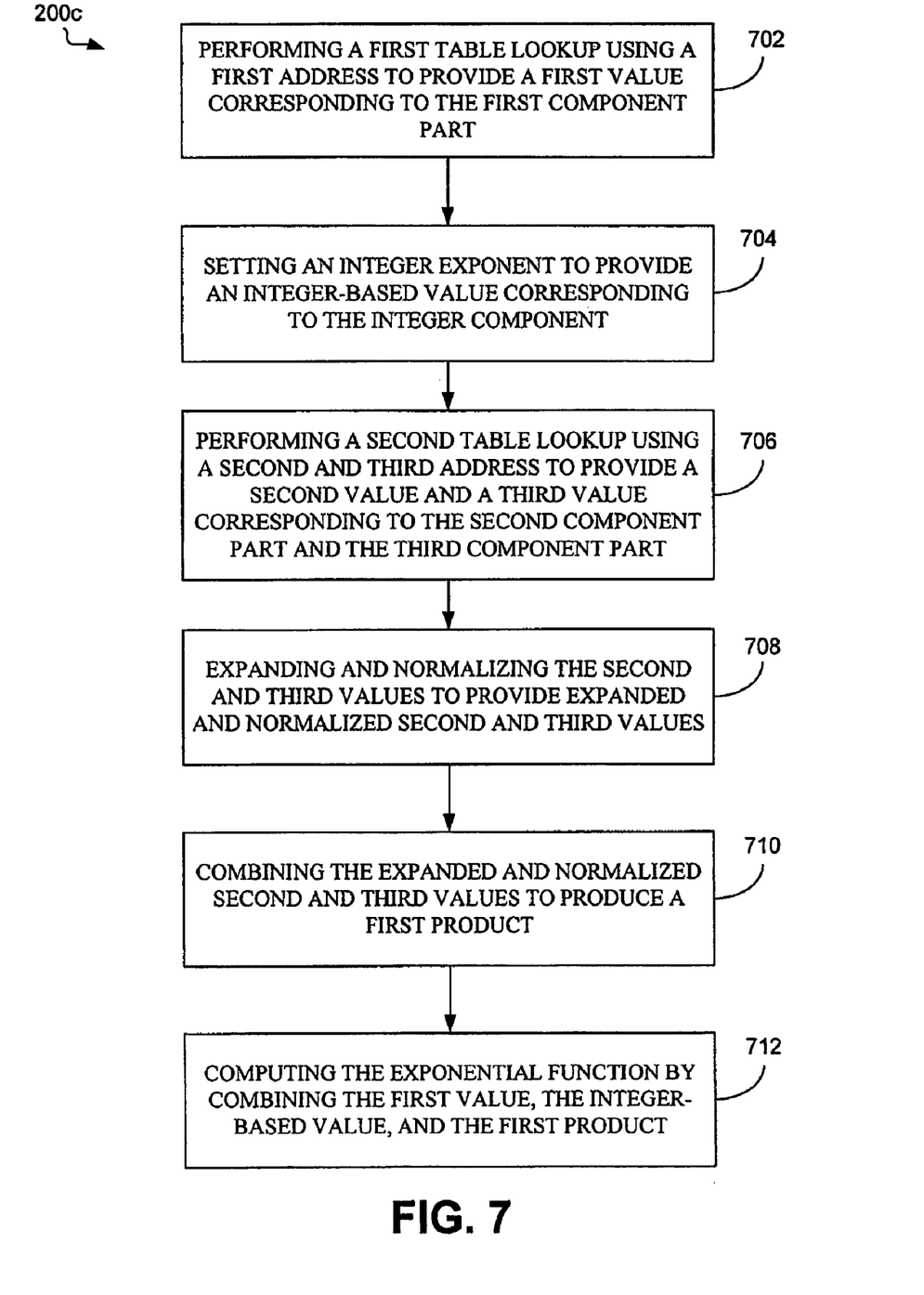
FIG. 7 is a flow diagram that illustrates one embodiment of an exponent processing method that uses two multiplication units.

In view of the above description, it will be appreciated that one embodiment of a exponent processing method 200c, as illustrated in FIG. 7, comprises performing a first table lookup using a first address to provide a first value corresponding to the first component part (702), setting an integer exponent to provide an integer-based value corresponding to the integer component (704), performing a second table lookup using a second and third address to provide a second value and a third value corresponding to the second component part and the third component part, respectively (706), expanding and normalizing the second and third values to provide expanded and normalized second and third values (708), combining the expanded and normalized second and third values to produce a first product (710), and computing the exponential function by combining the first value, the integer-based value, and the first product (712).

Figure 8:
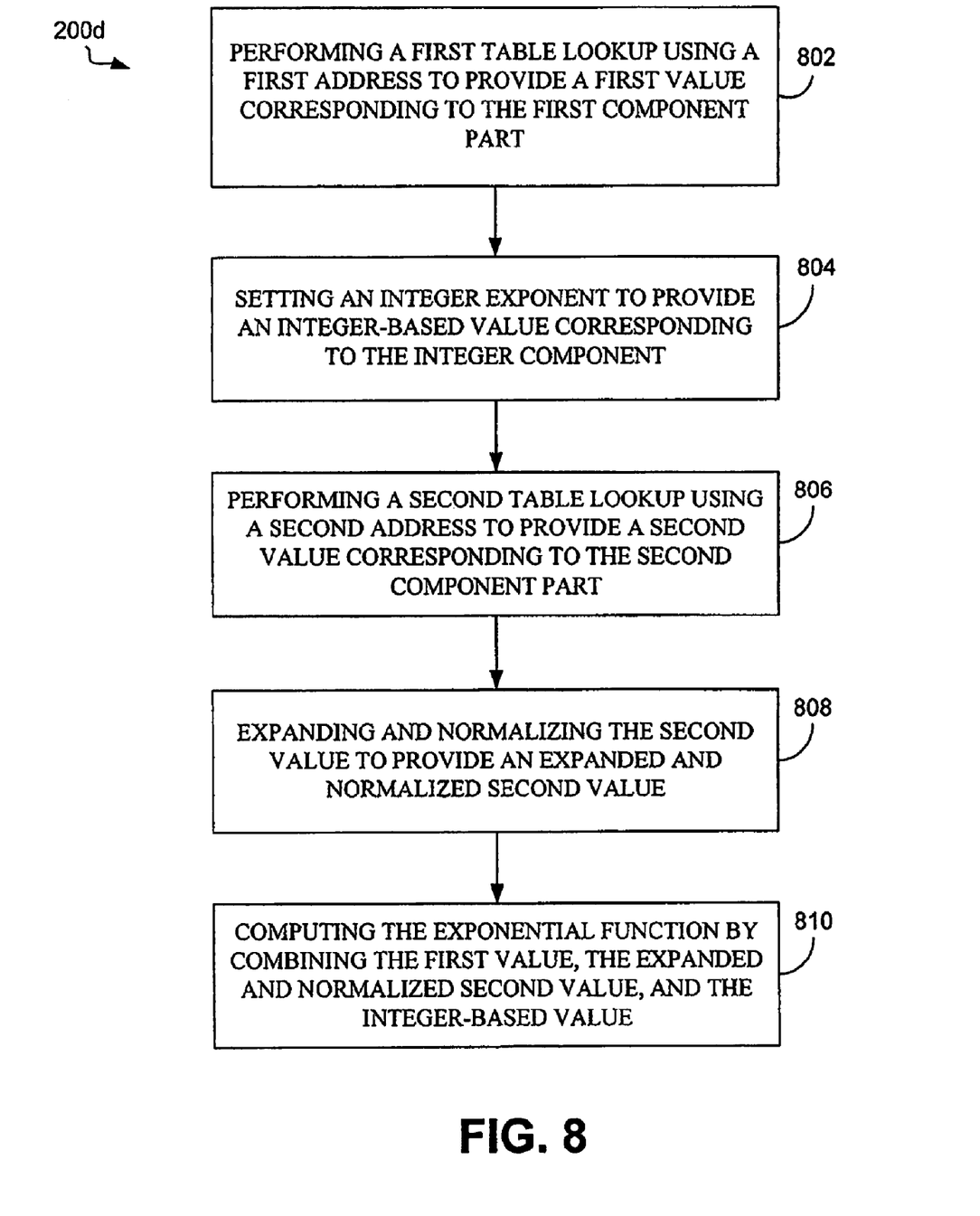
FIG. 8 is a flow diagram that illustrates one embodiment of an exponent processing method that uses one multiplication unit.

In view of the above description, it will be appreciated that one embodiment of a exponent processing method 200d, as illustrated in FIG. 8, comprises performing a first table lookup using a first address to provide a first value corresponding to the first component part (802), setting an integer exponent to provide an integer-based value corresponding to the integer component (804), performing a second table lookup using a second address to provide a second value corresponding to the second component part (806), expanding and normalizing the second value to provide an expanded and normalized second value (808), and computing the exponential function by combining the first value, the expanded and normalized second value, and the integer-based value (810).

Figure 9:
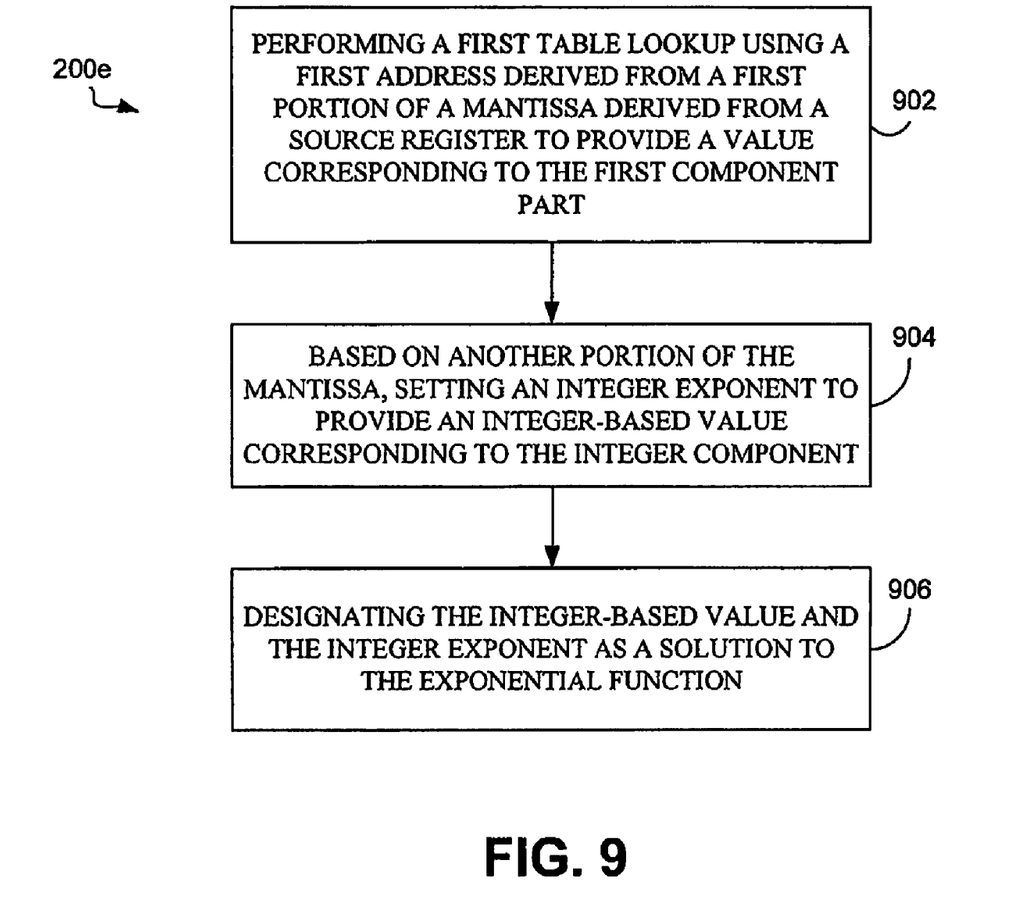
FIG. 9 is a flow diagram that illustrates one embodiment of an exponent processing method that uses no multiplication units.

In view of the above description, it will be appreciated that one embodiment of a exponent processing method 200e, as illustrated in FIG. 9, comprises performing a first table lookup using a first address derived from a first portion of a mantissa derived from a source register to provide a value corresponding to the first component part (902), based on another portion of the mantissa, setting an integer exponent to provide an integer-based value corresponding to the integer component (904), and designating the integer-based value and the integer exponent as a solution to the exponential function (906).

Any process descriptions or blocks in flow diagrams corresponding to FIGS. 7, 8, and 9 should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art.

The exponent processing systems 200 (e.g., 200a-200e) can be implemented in hardware, software, or firmware, or a combination of one or more of hardware, software, and firmware. In the preferred embodiments, the exponent processing system 200 is implemented in hardware, and can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments, particularly, any "preferred" embodiments, are merely possible examples of implementations, merely set forth for a clear understanding of the disclosed systems and methods. Many variations and modifications may be made to the above-described embodiment(s) without departing substantially from the disclosed principles. All such modifications and variations are intended to be included herein within the scope of this disclosure and protected by the following claims.

What is claimed:

1. An exponent processing method executed by a tangible processor for evaluating a base 2 exponential function $2^x$, where $2^x = 2^I \times 2^y$, where $2^I$ corresponds to an integer component, where $2^y$ corresponds to a fractional component, where $2^y = 2^{y0} \times 2^{y1} \times 2^{y2}$, and where $2^{y0}$, $2^{y1}$, and $2^{y2}$ correspond to first, second, and third component parts, respectively, of the fractional component, the method comprising:

performing a first table lookup by the processor using a first address to provide a first value corresponding to the first component part;

setting an integer exponent by the processor to provide an integer-based value corresponding to the integer component;

performing a second table lookup by the processor using a second and third address to provide a second value and a third value corresponding to the second component part and the third component part, respectively;

expanding and normalizing the second and third values to provide expanded and normalized second and third values;

combining the expanded and normalized second and third values to produce a first product; and computing the exponential function by the processor by combining the first value, the integer-based value, and the first product.

2. The method of claim 1, further comprising extracting a fraction part and an integer part from a shift register storing a mantissa value, the mantissa value derived from a source register.

3. The method of claim 2, wherein extracting comprises performing a shift operation on the mantissa value stored in the shift register.

4. The method of claim 3, wherein performing the shift further comprises performing a 1s-complement operation on the mantissa value stored in the shift register.

5. The method of claim 4, wherein performing the 1s-complement operation further comprises using a biased exponent bit derived from the source register.

6. The method of claim 2, further comprising either negating the fraction part by the processor and storing in a fractional register when the source register comprises a sign bit indicating a negative value, or storing the fraction part, un-negated, in the fractional register when the source register comprises a sign bit indicating a positive value.

7. The method of claim 6, wherein performing the first and second table lookups comprises using first, second, and third segments of the fractional register as the first, second, and third addresses.

8. The method of claim 2, wherein setting the integer exponent comprises either negating the integer part and biasing the negated value and storing the biased, negated value in an integer register when the source register comprises a sign bit indicating a negative value, or biasing an un-negated integer part and storing the biased, un-negated part in the integer register when the source register comprises a sign bit indicating a positive value.

9. The method of claim 8, wherein setting the integer exponent further comprises designating the integer exponent with a value in the integer register.

10. The method of claim 9, wherein setting the integer exponent further comprises handling exceptions pertaining to overflow and underflow conditions, wherein handling exceptions comprises determining whether the value in the integer register corresponds to an overflow condition or an underflow condition.

11. The method of claim 10, wherein setting the integer exponent further comprises resetting the integer exponent to a computed value responsive to determining whether the value in the integer register corresponds to an overflow condition or an underflow condition.

12. The method of claim 1, wherein expanding and normalizing comprises formatting in IEEE-754 floating point format.

13. The method of claim 1, further comprising storing the expanded and normalized second and third values in a first register and a second register.

14. The method of claim 13, wherein expanding and normalizing comprises adding leading zeroes and biasing an exponent portion in the first and second registers.

15. The method of claim 1, wherein combining the expanded and normalized values comprises multiplying the expanded and normalized second value with the expanded and normalized third value in a fused multiply and add (FMAD) unit, and storing the first product resulting from the multiplication in a temporary register.

16. The method of claim 1, wherein performing a first table lookup and a second table lookup comprises performing the first and second table lookups in a single table corresponding to a plurality of N single-instruction, multiple data (SIMD) units by limiting an issue rate to one every N cycles.

17. The method of claim 1, wherein performing the second table lookup comprises performing the table lookups in two tables in parallel.

18. The method of claim 1, further comprising storing the second and third values in a single register.

19. An exponent processing method executed by a tangible processor for evaluating a base 2 exponential function $2^X$ using a bipartite table method where $2^X=2^I \times 2^y$, where $2^I$ corresponds to an integer component, where $2^y$ corresponds to a fractional component, where $2^y=2^{y1} \times 2^{y2}$, where $2^{y1}$ and $2^{y2}$ correspond to first and second component parts, respectively, of the fractional component, the method comprising:
  performing a first table lookup by the processor using a first address to provide a first value corresponding to the first component part;
  setting an integer exponent by the processor to provide an integer-based value corresponding to the integer component;
  performing a second table lookup by the processor using a second address to provide a second value corresponding to the second component part;
  expanding and normalizing the second value by the processor to provide an expanded and normalized second value; and
  computing the exponential function by the processor by combining the first value, the expanded and normalized second value, and the integer-based value.

20. The method of claim 19, further comprising extracting a fraction part and an integer part from a shift register storing a mantissa value, the mantissa value derived from a source register.

21. The method of claim 20, wherein extracting comprises performing a shift operation on the mantissa value stored in the shift register.

22. The method of claim 21, wherein performing the shift further comprises performing a 1s-complement operation on the mantissa value stored in the shift register.

23. The method of claim 22, wherein performing the 1s-complement operation comprises using a biased exponent bit derived from the source register.

24. The method of claim 20, further comprising either negating the fraction part by the processor and storing in a fractional register when the source register comprises a sign bit indicating a negative value, or storing the fraction part, un-negated, in the fractional register when the source register comprises a sign bit indicating a positive value.

25. The method of claim 24, wherein performing the first and second table lookups comprises using first and second segments of the fractional register as the first and second addresses.

26. The method of claim 20, wherein setting the integer exponent comprises either negating the integer part and biasing the negated value and storing the biased, negated value in an integer register when the source register comprises a sign bit indicating a negative value, or biasing an un-negated integer part and storing the biased, un-negated part in the integer register when the source register comprises a sign bit indicating a positive value.

27. The method of claim 26, wherein setting the integer exponent further comprises designating the integer exponent with a value in the integer register.

28. The method of claim 27, wherein setting the integer exponent further comprises handling exceptions pertaining to overflow and underflow conditions, wherein handling exceptions comprises determining whether the value in the integer register corresponds to an overflow condition or an underflow condition.

29. The method of claim 28, wherein setting the integer exponent further comprises resetting the integer exponent to a computed value responsive to determining whether the value in the integer register corresponds to an overflow condition or an underflow condition.

30. The method of claim 19, wherein expanding and normalizing comprises formatting in IEEE-754 floating point format.

31. The method of claim 19, further comprising storing the expanded and normalized second value in a register.

32. The method of claim 31, wherein expanding and normalizing comprises adding leading zeroes and biasing an exponent portion in the register.

33. The method of claim 19, wherein computing by combining comprises multiplying the expanded and normalized second value, the first value, and the second value in a fused multiply and add (FMAD) unit.

34. The method of claim 19, wherein performing a first table lookup and a second table lookup comprises performing the first and second table lookups in a single table corresponding to a plurality of N single-instruction, multiple data (SIMD) units by limiting an issue rate to one every N cycles.

35. An exponent processing method executed by a tangible processor for evaluating a base 2 exponential function $2^x$, where $2^x=2^I \times 2^y$, where $2^I$ corresponds to an integer component, where $2^y$ corresponds to a fractional component, where $2^y=2^{y0}$, and where $2^{y0}$ corresponds to a first component part of the fractional component, the method comprising:
  performing a first table lookup using the processor using a first address derived from a first portion of a mantissa derived from a source register to provide a value corresponding to the first component part;
  based on another portion of the mantissa, setting an integer exponent using the processor to provide an integer-based value corresponding to the integer component; and
  designating the integer-based value and the integer exponent using the processor as a solution to the exponential function.

36. An exponent processing system embodied in tangible processing hardware for evaluating a base 2 exponential function $2^x$, where $2^x=2^I \times 2^y$, where $2^I$ corresponds to an integer component, where $2^y$ corresponds to a fractional component, where $2^y=2^{y0} \times 2^{y1} \times 2^{y2}$, and where $2^{y0}$, $2^{y1}$, and $2^{y2}$ correspond to first, second, and third component parts, respectively, of the fractional component, the system comprising:
  register logic embodied in the processing hardware configured to derive a fraction part and integer part from a source mantissa;

memory configured to provide, based on the fraction part, a first value corresponding to the first component, a second value corresponding to the second component part, and a third value corresponding to the third component part;

setting logic embodied in the processing hardware configured to set an integer exponent based on the integer part to provide an integer-based value corresponding to the integer component;

formatting logic embodied in the processing hardware configured to expand and normalize the second and third values to provide expanded and normalized second and third values; and combining logic embodied in the processing hardware configured to combine the expanded and normalized second and third values to produce a first product and compute the exponential function by combining the first value, the integer-based value, and the first product.

37. The system of claim 36, further comprising a source register configured to store the source mantissa and an exponent bit.

38. The system of claim 37, further comprising subtractor logic embodied in the processing hardware configured to bias the exponent bit, wherein the register logic is configured to receive the biased exponent bit and perform a shift operation and 1s-complement operation on the source mantissa.

39. The system of claim 36, wherein the register logic is further configured to either negate the fraction part and store the negated fraction part when the source register comprises a sign bit indicating a negative value, or store the fraction part, un-negated, when the source register comprises a sign bit indicating a positive value.

40. The system of claim 36, wherein the memory comprises a first table, a second table, and a third table.

41. The system of claim 36, wherein the setting logic comprises an integer register, the setting logic configured to set the integer exponent by either negating the integer part and biasing the negated value and storing the biased, negated value in the integer register when the source register comprises a sign bit indicating a negative value, or by biasing an un-negated integer part and storing the biased, un-negated part in the integer register when the source register comprises a sign bit indicating a positive value.

42. The system of claim 41, wherein the setting logic is configured to set the integer exponent by designating the integer exponent with a value in the integer register.

43. The system of claim 42, wherein the setting logic further comprises exception handling logic, the exception handling logic configured to handle exceptions pertaining to overflow and underflow conditions by determining whether the value in the integer register corresponds to an overflow condition or an underflow condition and resetting the integer exponent to a computed value responsive to determining whether the value in the integer register corresponds to an overflow condition or an underflow condition.

44. The system of claim 36, wherein the formatting logic comprises wire-OR logic configured to expand and normalize according to IEEE-754 floating point format.

45. The system of claim 44, wherein the formatting logic comprises second and third registers, the second and third registers configured to store the expanded and normalized second and third values by adding leading zeroes and biasing an exponent portion in the second and third registers.

46. The system of claim 36, wherein the combining logic comprises a fused multiply and add (FMAD) unit and a temporary register, the FMAD unit configured to multiply the expanded and normalized second value with the expanded and normalized third value, the temporary register configured to store the first product resulting from the multiplication.

47. The system of claim 36, wherein the memory comprises a single table configured for N single-instruction, multiple data (SIMD) operations.

48. The system of claim 36, further comprising a single register configured to store the second and third values.

49. An exponent processing system embodied in tangible processing hardware for evaluating a base 2 exponential function $2^x$ using a bipartite table method (BPTM) where $2^x=2^I \times 2^y$, where $2^I$ corresponds to an integer component, where $2^y$ corresponds to a fractional component, where $2^y=2^{y1} \times 2^{y2}$, where $2^{y1}$ and $2^{y2}$ correspond to first and second component parts, respectively, of the fractional component, the system comprising:

register logic embodied in the processing hardware configured to derive a fraction part and integer part from a source mantissa;

a BPTM memory configured to provide, based on the fraction part, a first value corresponding to the first component and a second value corresponding to the second component part;

setting logic embodied in the processing hardware configured to set an integer exponent based on the integer part to provide an integer-based value corresponding to the integer component;

formatting logic embodied in the processing hardware configured to expand and normalize the second value to provide an expanded and normalized second value; and combining logic embodied in the processing hardware configured to compute the exponential function by combining the first value, the expanded and normalized second value, and the integer-based value.

50. The system of claim 49, further comprising a source register configured to store the source mantissa and an exponent bit.

51. The system of claim 50, further comprising subtractor logic embodied in the processing hardware configured to bias the exponent bit, wherein the register logic is configured to receive the biased exponent bit and perform a shift operation and 1s-complement operation on the source mantissa.

52. The system of claim 49, wherein the register logic is further configured to either negate the fraction part and store the negated fraction part when the source register comprises a sign bit indicating a negative value, or store the fraction part, un-negated, when the source register comprises a sign bit indicating a positive value.

53. The system of claim 49, wherein the BPTM memory comprises a first BPTM table and a second BPTM table.

54. The system of claim 49, wherein the setting logic comprises an integer register, the setting logic configured to set the integer exponent by either negating the integer part and biasing the negated value and storing the biased, negated value in the integer register when the source register comprises a sign bit indicating a negative value, or by biasing an un-negated integer part and storing the biased, un-negated part in the integer register when the source register comprises a sign bit indicating a positive value.

55. The system of claim 54, wherein the setting logic is configured to set the integer exponent by designating the integer exponent with a value in the integer register.

56. The system of claim 55, wherein the setting logic further comprises exception handling logic, the exception handling logic configured to handle exceptions pertaining to overflow and underflow conditions by determining whether the value in the integer register corresponds to an overflow condition or an underflow condition and resetting the integer exponent to a computed value responsive to determining whether the value in the integer register corresponds to an overflow condition or an underflow condition.

57. The system of claim 49, wherein the formatting logic comprises wire-OR logic configured to expand and normalize according to IEEE-754 floating point format.

58. The system of claim 57, wherein the formatting logic comprises a register, the register configured to store the expanded and normalized second value by adding leading zeroes and biasing an exponent portion in the register.

59. The system of claim 49, wherein the combining logic comprises a fused multiply and add (FMAD) unit.

60. The system of claim 49, wherein the BPTM memory comprises a single table configured for N single-instruction, multiple data (SIMD) operations.

61. An exponent processing system embodied in tangible processing hardware for evaluating a base 2 exponential function $2^x$, where $2^x=2^I \times 2^y$, where $2^I$ corresponds to an integer component, where $2^y$ corresponds to a fractional component, where $2^y=2^{y0}$, and where $2^{y0}$ corresponds to a first component part of the fractional component, the system comprising:

register logic embodied in the processing hardware configured to derive a fraction part and integer part from a source mantissa;

memory configured to provide, based on the fraction part, a value corresponding to the first component part;

setting logic embodied in the processing hardware configured to set an integer exponent, based on the integer part, to provide an integer-based value corresponding to the integer component and designate the value and the integer-based value as a solution to the exponential function.

* * * * *